United States Patent
Hartig et al.

(10) Patent No.: US 7,919,881 B2
(45) Date of Patent: Apr. 5, 2011

(54) METHOD FOR SUPPLYING THE ELECTRICAL ON-BOARD POWER NETWORK OF SHIPS WITH EXTERNAL ENERGY

(75) Inventors: Rainer Hartig, Buxtehude (DE); Hannes Schulze Horn, Gladbeck (DE); Kay Tigges, Harsefeld (DE)

(73) Assignee: Siemens Aktiengesellschaft, Munich (DE)

( * ) Notice: Subject to any disclaimer, the term of this patent is extended or adjusted under 35 U.S.C. 154(b) by 154 days.

(21) Appl. No.: 12/085,520

(22) PCT Filed: Nov. 27, 2006

(86) PCT No.: PCT/EP2006/068961
§ 371 (c)(1),
(2), (4) Date: Jun. 13, 2008

(87) PCT Pub. No.: WO2007/060244
PCT Pub. Date: May 31, 2007

(65) Prior Publication Data
US 2009/0152945 A1    Jun. 18, 2009

(30) Foreign Application Priority Data

Nov. 28, 2005 (DE) .......................... 10 2005 056 700

(51) Int. Cl.
*B60L 1/00* (2006.01)
*B60L 3/00* (2006.01)
*H02G 3/00* (2006.01)
(52) U.S. Cl. ........................................ 307/9.1
(58) Field of Classification Search .................. 307/9.1, 307/145, 72, 80; 191/1 R, 7
See application file for complete search history.

(56) References Cited

U.S. PATENT DOCUMENTS

| 5,804,953 | A | 9/1998 | Bowyer |
| 5,920,467 | A | 7/1999 | Bowyer et al. |
| 2003/0052658 | A1* | 3/2003 | Baretich et al. ............... 323/284 |
| 2005/0184589 | A1 | 8/2005 | Fujita |
| 2006/0061213 | A1* | 3/2006 | Michalko ........................ 307/9.1 |

FOREIGN PATENT DOCUMENTS

| JP | 59-002114 | 1/1984 |
| JP | 07-132885 | 5/1995 |
| WO | WO 2004028899 A1 | 4/2004 |

OTHER PUBLICATIONS

GPD 503 Technical Manual; M/MagneTek, XP007901866, Seite 1 bis 160; Others.
Sinamics S150 Umrichter-Schrankgeräte, Katalog D21.3, Mai 2004; Siemens Katalog, Seite 1 bis 76; Others.

(Continued)

*Primary Examiner* — Jared J Fureman
*Assistant Examiner* — Carlos Amaya
(74) *Attorney, Agent, or Firm* — Harness, Dickey & Pierce, P.L.C.

(57) ABSTRACT

A method is disclosed for supplying external energy to electrical on-board power networks of ships, with there being at least one generator, one converter and electrical loads in the ship's on-board power network. In at least one embodiment of the method, the converter (shore connection converter) on board the ship, for transfer into the on-board power network, is fed by a connectable external current source with current of a different frequency and voltage to that of the on-board network and the current is converted in the converter semiconductors into current with the voltage, and the frequency of the on-board power network and fed to the on-board power network.

20 Claims, 4 Drawing Sheets

OTHER PUBLICATIONS

Siemens: ELFA Yacht Propulsion and Examples for Yacht Propulsion. In: Siemens Yacht Solutions, Aug. 2005; http://web.archive.org/web/20050819102557/http://automation.usa.siemens.com/marine/; Others.

Siemens: ELFA System Products. In: diesel-electric Propulsion. Oct. 2005.; http://automation.usa.siemens.com/marine/files/Siemens%20Diesel-Electric%20Propulsion%20-%20ELFA.pdf; Others.

Mastervolt Shoremaster—große Stückzahlen angestrebtl In: NWF nordwest-funk GmbH Pressemitteilung, Emden, May 23, 2002; http://www.nordwest-funk.de/downloads/mastervolt 23052002.pdf; Others.

Mastervolt Shoremaster—Concept, Highlights, Practice, References, Examples, Oktober 2004; http://web.archive.org/weg/20041025162115/www.mastervolt.de/shoremaster/index.asp; Others.

Joerg Flottemesch, Marcus Rother: Optimized Energy Exchange in Primary Distribution Networks with DC Links; In: 2004 IEEE International Conference on Electric Utility Deregulation, Restructuring and Power Technologies (DRPT2004) Apr. 2004 Hong Kong, Seite 108-116; Others.

XP007903530, Siemens, ELFA Yacht Propulsion and Examples for Yacht Propulsion, In: Siemens Yacht Solutions, Aug. 2005, URL: http://web.archive.org/web/20050819102557/http://automation.usa.siemens.com/marine/; Others.

International Preliminary Report on Patentability dated Feb. 28, 2008.

International Search Report and Written Opinion dated Jul. 17, 2007.

German Office Action dated Sep. 19, 2006.

German Office Action dated Jan. 26, 2007.

* cited by examiner

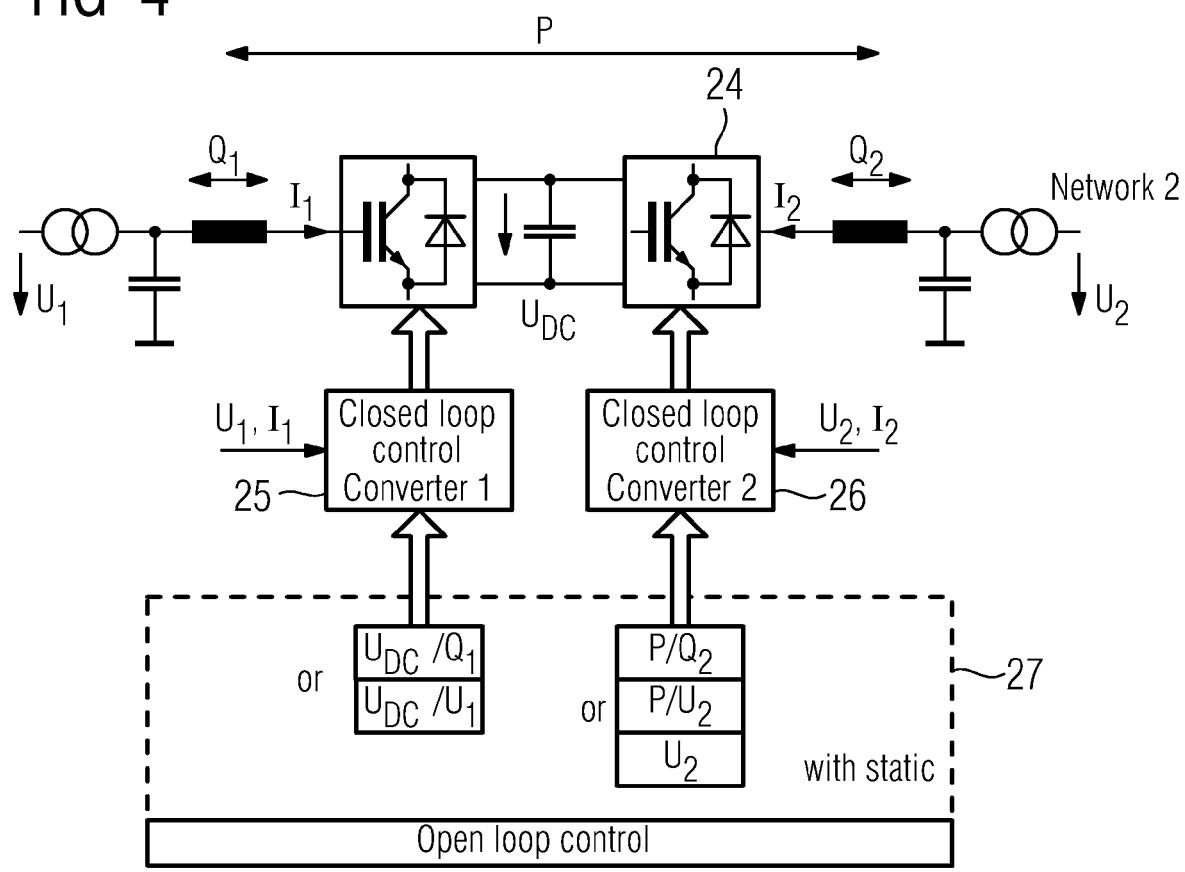

METHOD FOR SUPPLYING THE ELECTRICAL ON-BOARD POWER NETWORK OF SHIPS WITH EXTERNAL ENERGY

PRIORITY STATEMENT

This application is the national phase under 35 U.S.C. §371 of PCT International Application No. PCT/EP2006/068961 which has an International filing date of Nov. 27, 2006, which designated the United States of America and which claims priority on German patent application number 10 2005 056 700.2 filed Nov. 28, 2005, and also claims the benefit of U.S. Provisional Application No. 60/740,127, filed on Nov. 28, 2005. The entire contents of each of the above applications are hereby incorporated herein by reference.

FIELD

At least one embodiment of the invention relates to a method for supplying the electrical on-board power network of ships with external energy. In at least one embodiment, the on-board power network of ships contains at least one generator, one converter with control units and regulating devices and electrical loads.

BACKGROUND

The electrical equipment of a ship is known from WO 2004/028899 A1. In such cases this generally known electrical equipment also has an energy generator, for example, a generator for operation in port, which can be replaced by a shore connection via a plug-in connection. If the shore connection is plugged-in, it takes over the energy supply to the ship in port. Equivalent procedures are also known from aviation.

To make it possible for the functions to be taken over from the in-port generator by the shore connection, the shore connection must supply current with the voltage and the frequency of the on-board power network. However the disadvantage in such cases is the fact that such shore connections have to be specifically tailored (frequency and voltage) to the ship or aircraft to which current is to be supplied, and because of this are not always available. A suitable shore connection is usually only available at a permanent mooring or at larger airports.

Therefore, on calling at foreign ports or on flying into smaller airports, at least one in-port diesel generator set in the case of a ship or gas turbine generator in the case of an airplane continues to run for the duration of the stay. In such cases exhaust gases and noise are continuously generated. Because this is extremely annoying and pollutes the air, some port administrative authorities now prohibit the operation of in-port generators on ships.

In the case of aircraft, the passengers waiting on the apron are inconvenienced to a considerable extent. The generator of the aircraft is therefore only expected to operate for the shortest possible period in time. Shore connections are likewise already provided in some cases for yachts and also for passenger ships. Likewise, many airports already have terrestrial cable connections, which can be plugged-in accordingly. Even in the case of military (navy) ships, corresponding restrictions are increasingly being enforced.

SUMMARY

At least one embodiment of the invention specifies a method for ships by which the shore energy can be transferred without difficulties. In this case, the voltage and the frequency of the shore energy should not have to conform to the on-board power supply of the ship. However, according to an important subordinate object of at least one embodiment of the invention, it should be possible to carry out a load transfer without blackout during the transfer and it should be possible to switch off the generators located on board the ship without there being any disruptions in the network.

At least one embodiment of the invention includes converter (shore connection converter) found on board the ship, for transfer into the on-board power supply, being fed on the input side by a connectable external current source with current with a frequency and a voltage differing from that of the on-board power supply and by this being converted in the converter semiconductors into current with the voltage and the frequency of the on-board power network and fed to the on-board power network. This has the great advantage of allowing external current sources to be used, the voltage and frequency of which do not match the specific on-board power network. The connection can thus be carried out in a very advantageous manner without having to synchronize the on-board power network to the shore network. The control and regulating components of the shore connection converter simply cause said converter to accept energy from the external current source and convert the accepted energy into a current with the on-board-specific voltage and frequency with a correct phase relation.

This produces a previously unmatched flexibility in the supply of external current at low cost because a converter with on-board control and regulating components is present in any event on modern ships. Its function is simply changed in port into a shore connection converter. The monitoring devices present on the on-board side can also continue to be used. Of particular advantage is the fact that short-term voltage drops in the shore network, which occur once in a while in ports, or also a temporary failure of the external current source, which also occasionally occurs in ports, cannot cause damage to the on-board electronics. The same applies to overvoltage peaks. The shore connection converter can compensate for short-duration voltage drops and overvoltage peaks. Any existing low-voltage network or a medium-voltage network available in the port can be used and is not subject to any particular quality requirements.

In an embodiment of the invention provision is made for the ship's network or the aircraft network of control and regulating components to be regulated on the output side of the shore connection converter to a constant (rigid) frequency and voltage, which conforms to the momentary values of the on-board power network at the moment when the external current source is connected. Because of this, an interruption-free energy supply is possible at the moment when the external energy source is connected. The passengers will not notice the switchover from the on-board power network to the shore connection supply and the method avoids having to switch on the emergency lighting at the moment when the external energy is transferred (a process which frequently causes irritation). The details of the technical implementation are as follows:

The generator regulator takes care of maintaining the desired voltage of the on-board power network. The power management takes care of the automatic control of the energy generating sets such as switching on, switching off and load distribution.

The control and regulating components of the shore connection converter must be expanded to function as suppliers of current from the shore supply and must be included in the power management system of the ship. In the control and regulating system of the shore connection converter there must be a functional module for the transfer of the on-board power supply by the converter, in which case the on-board power network, at this point in time, is controlled by the on-board power supply generators. Power management then takes care of the load transfer to the shore network via the converter and switches off the on-board power supply generators. The on-board power supply is then controlled by the control and regulating components of the converter. The switchover from the shore connection to supply by the on-board power supply generators is subsequently undertaken in the reverse order. The switchovers must basically be carried out interruption-free.

In a further advantageous embodiment of the invention, provision is made for the fact that, after the external current source is connected up to the time that it is disconnected again, the on-board power supply and the external current source can advantageously continue to be operated with their predetermined, different voltages and frequencies! This makes the outside energy supply particularly simple and it also runs without interruption. Converters are designed for this type of operation.

In this case, of particular advantage is the fact that the shore connection converter is in a position to compensate for differences in the voltage and in the frequency during operation within the framework of technical feasibility.

In addition, provision has been made for the fact that the shore connection converter operates in four-quadrant mode. This makes the converter behave in an especially favorable manner during operation. In such cases it is also possible to couple different phase sequences.

Furthermore provision has been made especially advantageously for the shore connection converter to be controlled and regulated on the output side in such a way that, should performance requirements change, which is reflected in a tendency for the frequency to change, the power consumption is adapted in such a way that the frequency remains stable. Thus, for ships with a plurality of generators and large loads, a stable network is obtained in an especially advantageous manner even when the generators or the large loads are disconnected or connected, without there being voltage peaks or voltage drops. A stable network is also obtained at the moment the load is transferred in this way. The network instability which would otherwise frequently occur when the generators or the large loads are disconnected or connected, requiring regulation and control interventions by the crew, is now no longer applicable. Overall the energy supply of a ship with a plurality of generators and loads becomes considerably more secure and manageable. The shore connection converter handles some of the tasks which would previously have to have been handled by the on-board team.

Provision is made in this case, in an embodiment of the invention, for the control units and the regulating devices of the shore connection converter to operate on a software basis. This makes it possible for the shore connection converter to react securely and quickly to different supply and consumption conditions over a wide range. This means, that—guided by the frequency—the shore connection converter ensures the stability of the network. Changes in the load, which would otherwise manifest themselves as frequency deviations, are regulated out immediately.

In an embodiment of the invention provision has been made for a PWM converter to be used as the shore connection converter for the transfer of electrical energy. An especially simple direct conversion of the different voltages and frequencies to the required voltage and frequency is possible.

In another embodiment of the invention provision has been made for using an intermediate circuit converter, especially with a static component in the control device, as the shore connection converter for the transfer of electrical energy. Intermediate circuit converters are already widely used.

In principle, an intermediate circuit converter can only transfer active energy. An intermediate circuit converter has a capacitor as an energy store in the intermediate circuit. A self-driven power inverter for supplying the on-board power supply with a voltage can shift these two away from one another in their phase relation and in this way supply active components and reactive components to the on-board power supply. Depending on the dimensioning data, the power components of the converter can make available an apparent power to the on-board power supply. The power is thus limited by the apparent current of the converter. The active component and the reactive component are set by the loads. This also has to be taken into account when loads are connected.

In addition provision has been made in an embodiment of the invention, where there are large load differences between external current source and on-board network, for connecting a transformer on the input side, in particular an autotransformer with a plurality of voltage taps. In this way, the load of the shore connection converter can be relieved if required and also a ship having only a low-voltage network can be supplied in a simple and safe manner from an external current source with medium voltage, for example up to 10 kV or vice versa.

In addition, provision has also been made according to at least one embodiment of the invention, in the case of ships with an electrical drive system, for example, cruise liners, large yachts or military (navy) ships, for at least one converter of the drive system (booster, propulsion motor or thruster motor) to be used as the shore connection converter. In the case of ships, there is a tendency for the power demand for the hotel services, for example, for lighting, heating and cooling, to also increase because of increasing demands for comfort. The above-mentioned converters thus have a capacity reserve for implementing the invention, which will continue to keep the costs for implementing the method low when they are used in future.

In the case of container ships and for other ships which, because of their sailing profile and their performance requirements imposed on the electrical system, now frequently already have sets of shaft-driven alternators, provision has also been made in an advantageous manner for the converter of the sets of shaft-driven alternators to be used as a shore connection converter. The shaft-driven alternator system, like a booster system, is dimensioned so that the on-board power network of the container ship or other ships with sets of shaft-driven alternators can cope with the higher requirements for generating electrical energy in future. For example the number of refrigerated containers is continuously increasing in the case of container ships.

In order to increase safety when transferring higher power, it is advantageous to use more than one shore connection terrestrial cable. This also makes the cables themselves lighter and able to be handled more easily.

In addition, provision has been made, in the event of a temporary failure or a disconnection of the external energy, for the on-board accumulators to take over the power supply, at least in part, and to be connected to the shore connection converter.

A sudden failure of the shore supply will result in a short-term blackout in the on-board power network. The power management takes care of starting up an emergency generator as well as starting up the on-board power network generators. However, this usually takes approximately 45 seconds. In this case, the energy of the on-board batteries cannot then support the entire hotel load of the on-board power network; the power required for this is too high. The support is essentially only sufficient in order to shut down the shore connection converter in a regulated manner, to maintain the emergency lighting and to start the emergency generator or the on-board power network generators.

Even with passenger ships there have been cases in recent years in which all the generators on board said ship have failed temporarily. A failure is in particular possible in the case of military (navy) ships, which for example have been subjected to a terror attack in port. In accordance with at least one embodiment of the invention, a complete blackout, which would be associated with the failure of the normal generator, can be avoided in this case. In this way, the ship remains able to communicate and the interior lighting can remain operative at an intensity which considerably improves the repair work and the assessment of the damage.

BRIEF DESCRIPTION OF THE DRAWINGS

Embodiments of the invention is described in greater detail with reference to drawings, from which, in the same way as from the subclaims, inventive features can also be taken. These drawings are as follows:

FIG. 4 a diagram of the electrical structure of a suitable converter.

DETAILED DESCRIPTION OF THE EXAMPLE EMBODIMENTS

Figure 1:
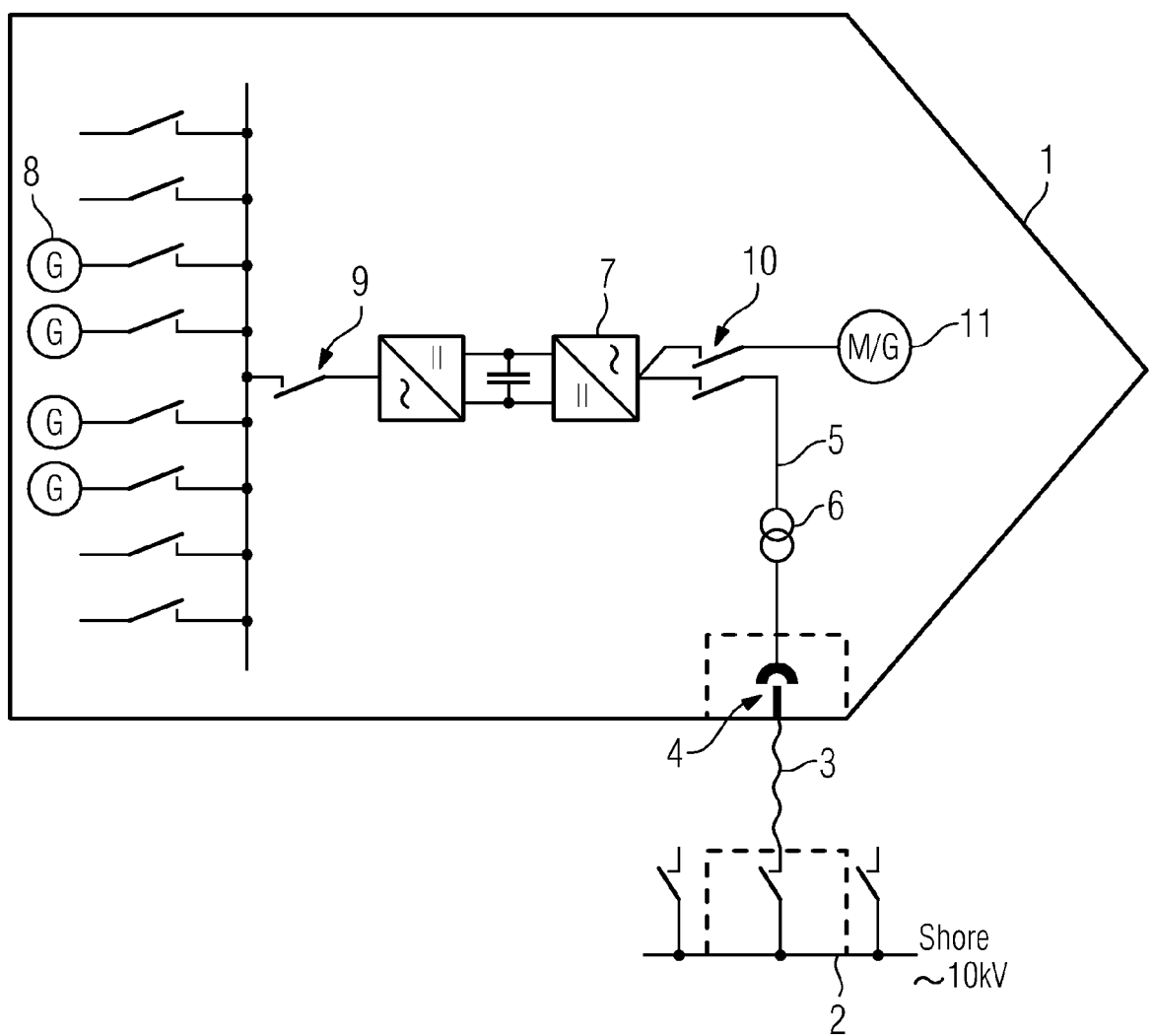
FIG. 1 shows a schematic diagram of a typical ship with inventive components of an embodiment on board.

In FIG. 1, the number 1 refers to the schematic outline of a ship and the number 2 to a medium voltage shore connection. A voltage of up to 10 kV is specified for the shore connection. This typically represents a medium-voltage network, which is frequently available in ports. 3.3 or 6.6 kV could of course also be possible. All voltages are possible here according to an embodiment of the invention. By way of the cable indicated by the number 3 in the diagram, a number of cables run in parallel can also be used for this task in order to increase the safety and allow easier handling, the electrical energy is fed into the plug-in connection 4 and is transferred from there to the ship's network 5. Frequently a transformer 6 is also connected between the two in order to be able to match the voltage of the ship's network 5 in an advantageous manner for instance.

In addition, the diagram shows a typical converter 7 in the ship, which is fed by one or more of the generators 8. In this case, the generator or generators can either be generators of the ship's drive train, sets of shaft-driven alternators, or the generators of diesel generator sets, which have been distributed in the ship. The propulsion motor of the ship 11 is for example supplied with energy via the switchgears 9 and 10, which in the case of modern container ships can be embodied as a booster/a set of shaft-driven alternators. Not shown and not to be included in considerations is a main diesel engine of the ship, if this is present. However, even when using a main diesel engine as the drive, there is usually at least one converter for at least one generator. Should this not be the case, such a converter can easily be retrofitted without any problems whatsoever. The retrofitting can also include a plurality of smaller converters operating in parallel. This is recommended if a number of feed cables are to be used.

Figure 2:
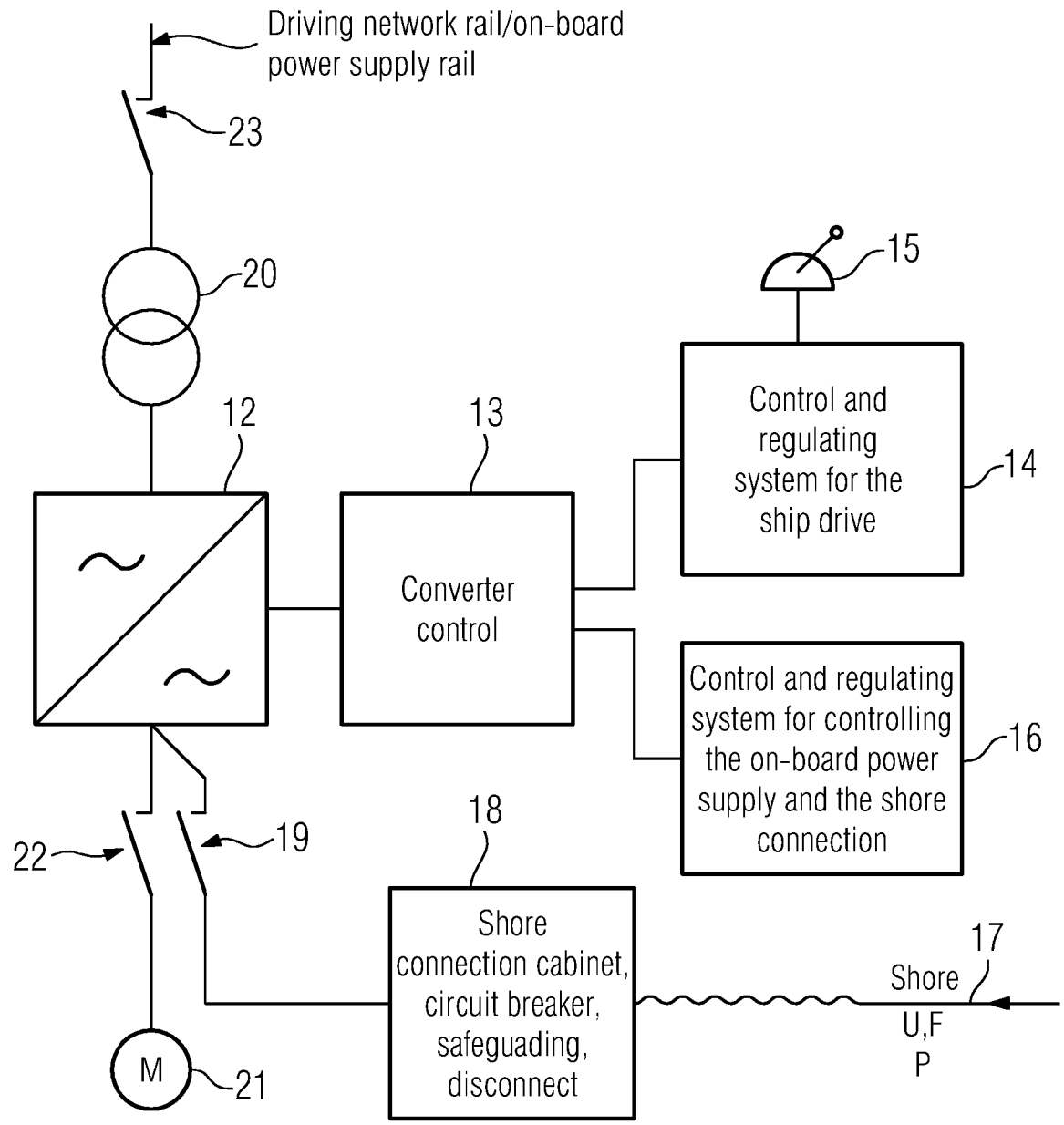
FIG. 2 a schematic diagram of the most important parts according to an embodiment of the invention using as an example a ship with an electrical drive unit.

In FIG. 2 the number 12 refers to an embodiment of the inventive shore connection converter used with its converter control 13. 14 refers to the control and regulating system for the ship drives with the driving lever 15. 16 refers to the control and regulating system for controlling the on-board power supply and in addition the shore connection. The power supply is designated with a 17, it has its own voltage U, a frequency F and a phase relation P and is connected to a circuit breaker on the shore side. With these features, the current of the shore connection passes into the shore connection cabinet 18 and is transferred from there via the switch 19 to the shore connection converter 12.

The transformer which might advantageously be provided is not shown in this diagram. In its place, the converter 12 has a transformer 20, which together with the converter 12 and the motor 21 form the power train. Switches 22 and 23 complete the drive diagram. Naturally switches 19 and 22 have been designed in such a way that a simultaneous closing is impossible so that the motor 21 is safely prevented from starting while the shore connection 17 is still engaged. (locking)

Figure 3:
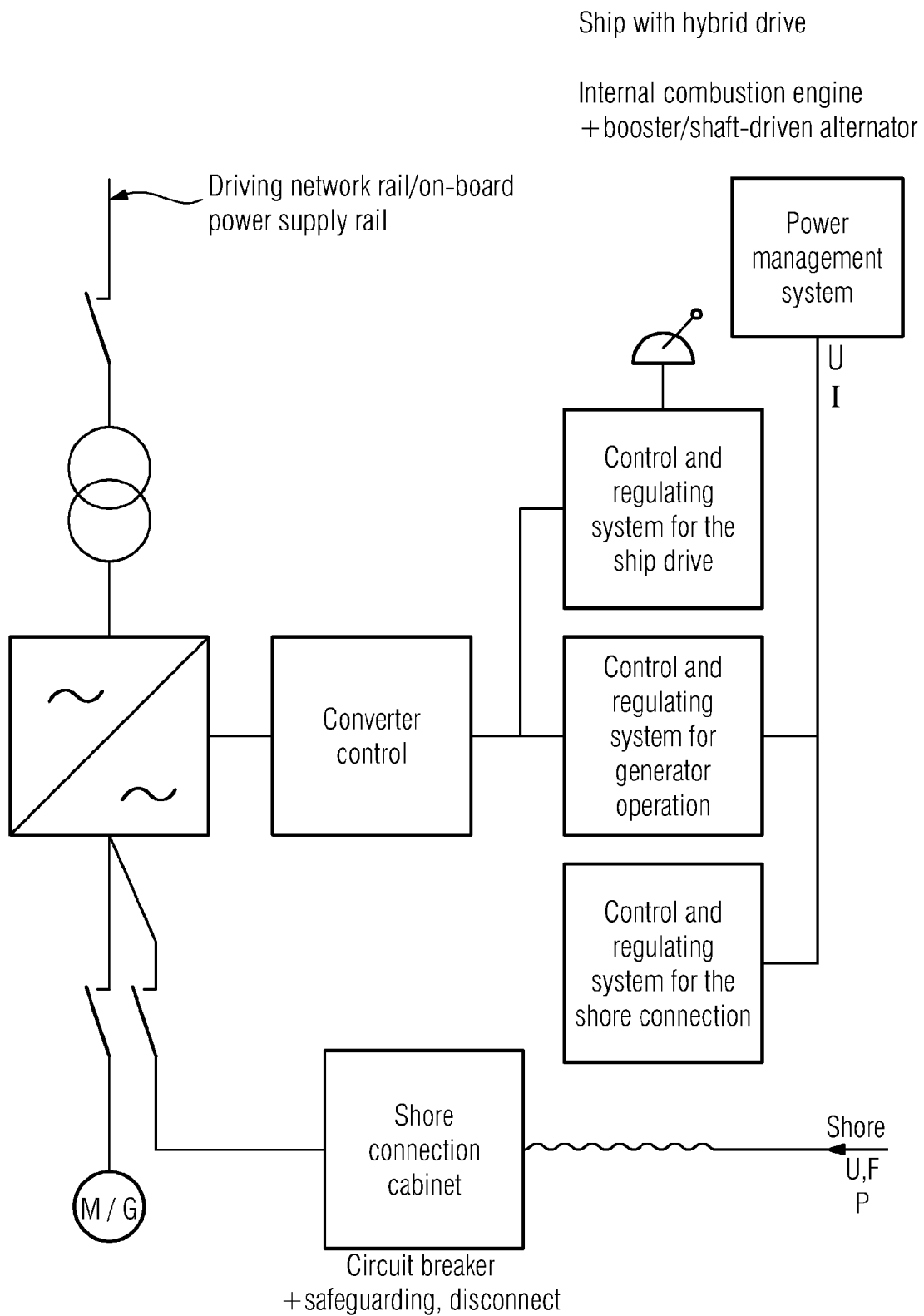
FIG. 3 a schematic diagram of the most important parts according to an embodiment of the invention using as an example a ship with a hybrid drive.

FIG. 3 shows a variation of FIG. 2. In this case, the electrical propulsion motor M is replaced by an electrical motor/generator device, which is preferably fitted to the propeller shaft. Such hybrid systems in addition have a power management system in which the generators shown in FIG. 1 or the additional sets of diesel generators present on board large ships have, for instance, also been included in this case in order to make possible an optimum generation of electrical energy on board ships.

FIG. 4 shows a converter which is particularly suitable and on the input side of which the voltage U1 is applied, whereas on the other side, the voltage U2 is output. The converter, which is shown in a conventional manner, has an intermediate circuit, in which case both parts of the converter have an independent regulator. In this way, it is possible to set the voltages and the currents for the inventive power shown in the diagram. The converter is identified by the number 24, whereas the converter regulators are identified by the numbers 25 and 26. If required, the converter also has an additional regulating facility, which if required contains an additional static component. This additional converter regulation is designated with a 27. It can carry out reactive power compensation.

As has already been mentioned, the person skilled in the art of converters is well aware of the technical design of such converters, and the technical embodiment of such converters does not form part of the subject matter of this invention. An installed converter with known control units and regulating devices is instead installed and adjusted in such a way that it processes the shore network available on the input side and generates a current on the output side in a stable manner, corresponding to the on-board power supply conditions as regards voltage, frequency and phase relation.

In principle, the method according to an embodiment of the invention is also suitable for the power supply of aircraft in airports. However, because aircraft currently do not work with converters, but with special generators, they still do not have suitable converters. In this case, a corresponding land connection converter currently has to be retrofitted. However, equipping, in particular, large aircraft with converter-fed on-board power supplies is fully expected in the course of further technical developments. Even though no express reference is made to aircraft, embodiments of the invention are also intended to extend to such aircraft.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. Method for supplying current to at least one electrical on-board power network of a ship including at least one generator, at least one converter and electrical loads in the ship's on-board power network, the method comprising:
receiving a current with a frequency and a voltage differing from that of the at least one electrical on-board power network at a converter that provides on-board generated power to an electrical propulsion system of the ship, for transfer into the at least one electrical on-board power network and via a connectable external current source on an input side; and
converting the current received in the converter into current with a voltage and a frequency of the at least one electrical on-board power network; and
supplying the converted current to the at least one electrical on-board power network, wherein the converter is used as a shore connection converter.

2. Method as claimed in claim 1, wherein the ship's network of control and regulating components is regulated on the output side of the shore connection converter to a constant frequency and voltage, which matches the momentary values of the at least one electrical on-board power network at a moment when the external current source is connected.

3. Method as claimed in claim 2, wherein, after the connection of the external current source and until it is disconnected again, the at least one electrical on-board power network and the external current source continue to be operated with their designated different voltages and frequencies.

4. Method as claimed in claim 2, wherein the shore connection converter runs in four-quadrant mode.

5. Method as claimed in claim 1, wherein, after the connection of the external current source and until it is disconnected again, the at least one electrical on-board power network and the external current source continue to be operated with their designated different voltages and frequencies.

6. Method as claimed in claim 1, wherein the shore connection converter runs in four-quadrant mode.

7. Method as claimed in claim 1, wherein the shore connection converter is regulated on the output side in such a way that, in the case of changed performance requirements, which manifest themselves in a tendency for the frequency to change, the power output is adapted in such a way that the frequency remains stable.

8. Method as claimed in claim 1, wherein control units and regulating devices of the shore connection converter operate on a software basis.

9. Method as claimed in claim 1, wherein a PWM converter is used as the shore connection converter as the transfer converter for the transfer of electrical energy.

10. Method as claimed in claim 1, wherein an intermediate circuit converter having a static component in its regulation, is used as the shore connection converter for the transfer of electrical energy.

11. Method as claimed in claim 1, wherein, in the case of large voltage differences between external current source and on-board power network on the input side a transformer is connected between the two.

12. Method as claimed in claim 11, wherein the transformer is an autotransformer with a plurality of voltage taps.

13. Method as claimed in claim 1, wherein, in the case of high-power shore connections, a plurality of feed cables run in parallel are used.

14. Method as claimed in claim 1, wherein the ship with an electrical propulsion system includes at least one of a cruise liner, a large yacht and a military ship.

15. Method as claimed in claim 14, wherein, in the case of a short-term failure or a disconnection of the external energy, on-board accumulators take over the emergency power supply via the intermediate circuit of the shore connection converter.

16. Method as claimed in claim 15, wherein the at least one converter of the propulsion system is a converter of at least one of a propulsion motor, a booster and a thruster motor.

17. Method as claimed in claim 14, wherein the at least one converter of the propulsion system is a converter of at least one of a propulsion motor, a booster and a thruster motor.

18. Method as claimed in claim 1, wherein, in the case of ships with sets of shaft-driven alternators, the converter of the sets of shaft-driven alternators is used as a shore connection converter.

19. Method as claimed in claim 1, wherein, in the case of a short-term failure or a disconnection of the external energy, on-board accumulators take over the emergency power supply via the intermediate circuit of the shore connection converter.

20. Method as claimed in claim 1, wherein the at least one converter of the propulsion system is a converter of at least one of a propulsion motor; a booster and a thruster motor.

* * * * *